Aug. 26, 1941.   K. B. McALPINE   2,254,079
METHOD AND APPARATUS FOR FORMING AND REFINING GLASS
Filed Feb. 6, 1940   2 Sheets-Sheet 1
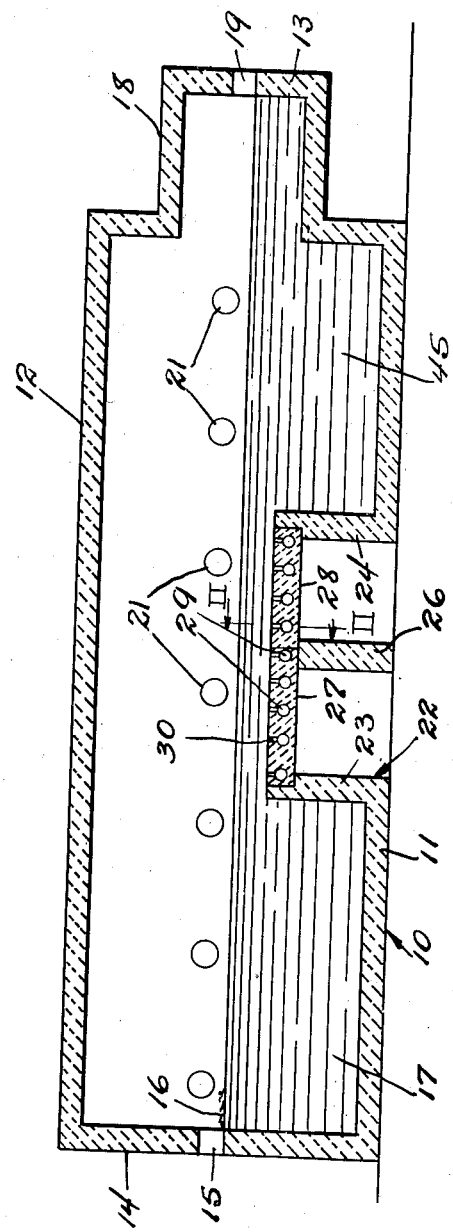
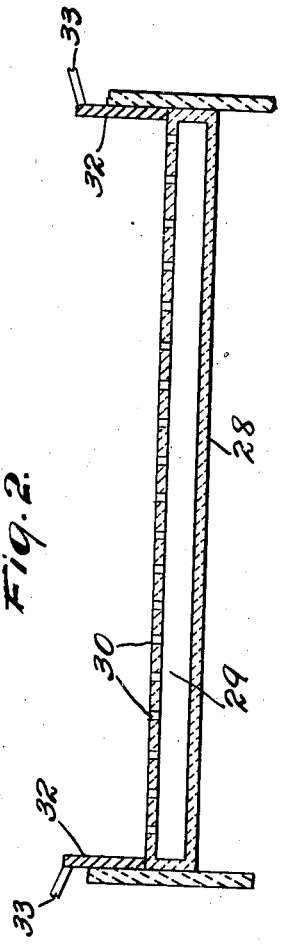
INVENTOR
KENNETH B. McALPINE
BY
Olew E. Bee
ATTORNEY.

Patented Aug. 26, 1941

2,254,079

UNITED STATES PATENT OFFICE 2,254,079

METHOD AND APPARATUS FOR FORMING AND REFINING GLASS

Kenneth B. McAlpine, Pittsburgh, Pa., assignor to Pittsburgh Plate Glass Company, Allegheny County, Pa., a corporation of Pennsylvania Application February 6, 1940, Serial No. 317,551

5 Claims. (Cl. 49—54)

The present invention relates to the treatment of glass, and it has particular relation to methods of and apparatus for treatment of glass in molten state, for purposes of removing gaseous or vaporous constituents therefrom.

One object of the invention is to provide a process and apparatus, application of which admits of exceptionally rapid, thorough and uniform removal of the objectionable gases from molten glass.

A second object of the invention is to provide a furnace in which glass can be rapidly and effectively degasified without excessive corrosion.

A third object of the invention is to provide a process and apparatus of the foregoing type which are simple and inexpensive to construct and operate.

These and other objects of the invention will be apparent from consideration of the following specification and the appended claims.

In the manufacture of glass, sand (silica) and compounds, such as calcium carbonate, sodium carbonate, or equivalent alkali and alkali earth compounds, are admixed and fused together into a homogeneous mass. The formation of the glass is accompanied by liberation of large amounts of gases, such as carbon dioxide, sulphur dioxide, water vapor and the like. Most of these gases collect in relatively large bubbles which make their way to the surface of the molten body and escape. This escape is promoted by a fining operation involving heating the molten glass until it becomes relatively fluid, e. g. to a temperature of about 2200 to 2700 degrees F., dependent somewhat upon the fusing characteristics of the glass. However, it is difficult to obtain the glass in such fluid condition that the smaller bubbles of gas can make their way to the surface.

In order to promote the escape of the smaller bubbles, it is common practice to "fine" or block the molten glass by introducing into it organic substances such as potatoes, apples, blocks of wood, or the like, which by reason of internal decomposition or by reason of reaction with the constituents of the glass, are capable of liberating large volumes of gases as bubbles of substantial size. The large bubbles readily make their way to the surface of the molten glass and in so doing tend to collect and carry along the smaller bubbles or "seeds" which are suspended in the glass. However, even the sweeping action produced is not sufficient to carry away all of the gases. Moreover, the action is irregular, spasmodic and highly localized, because the blocking body under the influence of intense heat decomposes very quickly, giving off huge quantities of gases in a zone immediately contiguous thereto. The rush of gases may be so violent as to cause the molten glass to bubble over. However, the reaction quickly subsides, leaving much of the glass inadequately fined. The various residual gases, or vapors contained in the glass tend to collect in minute bubbles, which as the glass cools become permanently entrapped. In quality products, such as plate glass, mirrors and the like and in glass used for forming fibers, the bubbles or "seeds", as they are termed, are highly objectionable.

The present invention involves the provision of a process and an apparatus for removing gases from molten glass in which the molten glass is caused to flow as a relatively thin and highly fluid sheet and while so flowing is subjected to a so-called "blocking" or sweeping operation to remove "seeds" by continuously bubbling gases therethrough. Under such conditions, the gases have only a short distance to travel to reach the surface and can quickly make their escape from the viscous body. Moreover, it is possible to maintain the thin sheet in relatively uniformly superheated and highly fluid state, which is found to assist in the elimination of bubbles.

For a better understanding of the invention reference may now be had to the accompanying drawings in which Figure 1 is a sectional view showing in conventionalized manner a furnace suitable for use in practicing the invention.

Figure 2 is a fragmentary sectional view taken substantially upon the line II—II of Figure 1.

Figure 3:
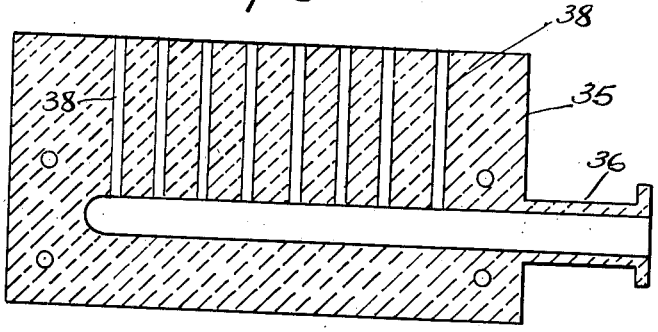
Figure 3 is a detailed view showing in section a suitable distributor device for supplying bubbles of gas to the molten glass.

In the form of apparatus illustrated in Figure 1 of the drawings a furnace 10 of the continuous tank type is shown as embodying a bottom 11, a top 12 and walls 13. The rear wall 14 is formed with an opening 15 for the admission of glass batch material 16 into pool 17 of molten glass. The forward extremity of the furnace is provided with a suitable drawing compartment 18, having an opening 19 through which molten glass in refined state may be removed and formed into sheets or other suitable articles. The furnace may be heated by appropriate means, for example, by means of a mixture of air and ordinary fuel gas introduced through a series of ports 21.

At an appropriate intermediate point in the furnace, (e. g. at a point where the glass reaches a temperature of about 2200 to 2800° F.) is disposed a bridge structure 22 constituting a dam and embodying partitions 23, 24, and if desired an intermediate partition 26. These partitions are bridged with one or more plates which are provided with gas distributing means. Two such plates are indicated as 27 and 28. They may be formed of refractory material, such as silica, fire-clay, alundum or the like and may be provided with channels 29 for the admission of gases for blocking the glass flowing as a relatively thin layer over the top plate. The channels or inlets are provided with a series of small outlet ports or openings 30 through which the gases escape upwardly into the glass.

Escape of the gases including the seed, as well as the sweeping or blocking gases is promoted by maintaining the glass above the plate 27 in relatively fluid state. This may be accomplished by application of heat to the glass by means of the combustion of gases from inlet ports 31 directly above the surface of the thin sheet.

It is also possible to superheat the glass in this zone by means of electrodes. Such electrodes, as best shown in Figure 2 may comprise a pair of conduction plates 32, of heat and corrosion resistant material such as platinum, disposed upon opposite sides of the furnace and being supplied with current by means of conductors 33 extending through the side walls of the furnace.

Figure 4:
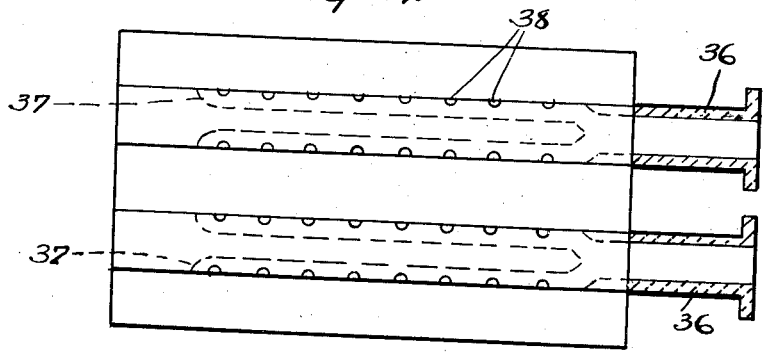
Figure 4 is a plan view of the construction shown in Figure 3.

If desired, the plate 27 may be replaced by the constructions shown in Figures 3 and 4. This construction includes blocks or bars 35 of refractory material designed to span the space across the furnace, and alternate ones of which are provided with extensions 36 constituting conduits for the admission of suitable blocking gases. These conduits communicate with channels 37, as best shown in Figure 4, extending along the sides of the bars. At appropriate intervals notches 38 providing outlets for gases admitted to the channels 37 are provided in the edge of the bars.

Figure 5:
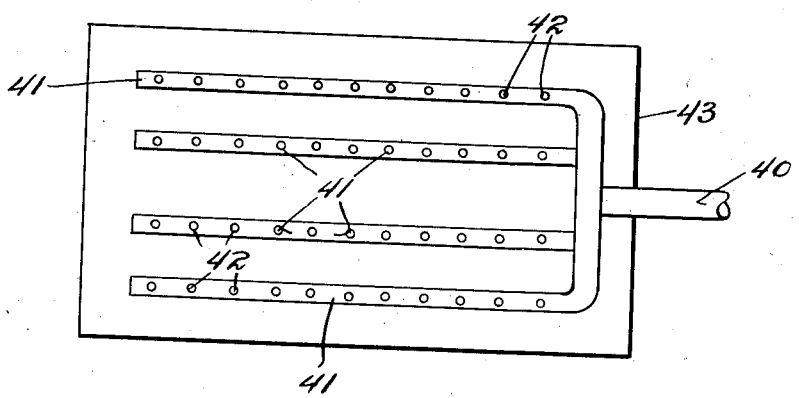
Figure 5 is a plan view of a further form of distributor for gases used in practicing the invention. In the drawings like numerals refer to like parts throughout.

In the form of the invention shown in Figure 5, a distributor for gases embodies a conduit 40 formed of platinum or other heat and corrosion resisting material. This conduit is provided with any appropriate number of branches 41 having a series of fine outlets 42 formed therein. The distributor may be supported in suitable grooves (not shown) formed in a slab 43 of silica or other refractory material which may constitute the element bridging the space between the partitions 22, 24 and 26, as shown in Figure 1. It is also apparent that the distributor may comprise a simple, porous plate of alundum or other refractory substance through which gases are forced by pressure from below.

As many distributors as may be desired may be employed in series in the furnace. If carbon monoxide is employed as a gaseous medium of sweeping out seeds from the molten glass, it will be found that as the operation progresses there is a tendency of the carbon monoxide, by reason of its reducing action to produce a brown discoloration in the glass. This discoloration may be eliminated by subjecting the molten glass for a short period of time to the oxidizing effect of air or other oxidizing gas which may be bubbled therethrough by means of the second distributor 28.

Although it is preferable to introduce gases directly into the molten glass it may sometimes be desirable to introduce a gas-forming agent in solid or liquid state into the molten glass while it is over or just before it reaches the bridge. For example, oxalic acid may be introduced into fusible glass tubes or into infusible but perforate metallic tubes and submerged in the glass to decompose and form carbon monoxide.

As a medium for blocking or sweeping out fine bubbles or seeds in the molten glass, various gaseous media may be employed. Air probably constitutes the most common and least expensive of these media. However, steam, carbon dioxide, nitrogen and other gases may be employed. Probably carbon monoxide is one of the most satisfactory because it is characterized by the ability rapidly and efficiently to remove water vapors which it has been found by experience cannot be removed by most of the available gases. If it is not deemed necessary to remove water vapors, any of the other gases may be employed.

In the operation of the process, batch material is fed into the tank through opening 15, while heat is supplied by combustion of fuel gases and air admitted through ports 21. The batch is gradually fused down in the pool 17 of molten glass. The molten material moves slowly forward at the same time losing most of its readily removable gases. It will be apparent that the hotter material may be near the center of the current and when it strikes wall 23 it is forced to rise and, also, to spread laterally so that the thin stream moving across the bridge is relatively uniformly heated. The gases should be fed upwardly into the thin stream in such manner that bubbling is uniform and not excessively violent. The bubbles should not be too large because as the size increases the area of contact between the molten glass and the gases increases. However, if the bubbles become too fine they can not readily escape through the viscous liquid. In general they should be substantially bigger than the seeds to be removed.

In the event that carbon monoxide used in the blocking operation produces a brown color it may be desirable to bubble air from a portion of the distributor system until the glass is clear.

The molten glass, after flowing as a thin stream over the bridge, is received in quiescent pool 45, provided by the deepening of the furnace to its original depth on the bridge. In this pool the bubbles of gas carried in the molten material are afforded further opportunity to escape. Ultimately fined molten glass flows into the drawing compartment 18 and is removed for forming into sheets or other bodies.

The foregoing apparatus possesses numerous advantages. For example, it is highly efficient as a means for eliminating the seed from the glass. The latter in flowing over the bridge 22 is distributed as a thin stream. Likewise, the thin sheet or stream may be easily and quickly brought to such high temperature that it readily admits of the escape of gases therethrough.

In the main portions of the tank where the glass is relatively deep the motion is very slow and quiescent. There is no agitation of the glass by bubbles introduced therein; therefore corrosive action upon the side walls and bottom of the tank are reduced to a minimum. The portion of the glass which is subjected to vigorous agitation and to rapid flow is so restricted that corrosive action is highly localized, thus admitting of quick and relatively inexpensive repairs in event that it becomes excessive in the local zone. The flow of blocking gases into the glass may be controlled in such manner as to obtain practically uniform and constant blocking without any violent ebullition which might result in spattering of the material.

Moreover, even in the localized zone, if the distributor is provided with fine, numerous and uniformly spaced openings, the surface is to a considerable extent protected by a blanket of gases.

The forms of the invention herein described are to be considered as constituting different examples of the invention. It will be apparent that numerous modifications may be made therein without departure from the spirit of the invention or the scope of the claims.

What I claim is:

1. A process of forming seed free glass, which process comprises introducing glass batch into a tank furnace, fusing the batch down into a pool of molten glass, which flows slowly forward in the tank, then flowing the glass over an obstruction in an intermediate part of the tank as a relatively thin sheet, while heating it further in order to obtain high fluidity, blowing bubbles of a sweeping gas through the glass while it is moving as such sheet, then again collecting it as a deep slow moving pool and finally withdrawing molten substantially seed free glass from the latter pool.

2. A process as defined in claim 1 in which the sweeping gas is carbon monoxide.

3. Apparatus for forming and refining glass comprising a tank having an opening formed at one end thereof for the admission of glass batch and a second opening at the opposite end for the removal of refined but molten glass, the tank being formed to provide relatively deep pools of quiescent molten glass at opposite ends and a bridge constituting a dam intermediate of the two pools, extending transversely of the tank and terminating below the surface of the glass, whereby the glass is forced to flow as a relatively thin sheet over the top of the bridge, said bridge being formed with conduits and openings communicating with the conduits and being distributed over the upper surface of the bridge for introducing bubbles of gas into the stream.

4. A process of removing seed-free glass, which process comprises flowing the glass in molten state as a thin sheet over a surface from which bubbles of carbon monoxide escape upwardly through the sheet and subsequently treating the molten glass with an oxidizing gas to remove color.

5. A process of forming seed-free glass, which process comprises introducing glass batch into a tank furnace, fusing the batch down into a pool of molten glass which flows slowly forward in the tank, then flowing the glass as a relatively thin sheet over a bridge constituting a dam placed transversely of the flow of glass in an intermediate portion of the tank, blowing bubbles of sweeping gas through the glass while it is moving in the sheet, then collecting the glass as a deep slow moving pool and finally withdrawing the molten substantially seed-free glass from the latter pool.

KENNETH B. McALPINE.